(12) United States Patent
Yan et al.

(10) Patent No.: US 7,691,514 B2
(45) Date of Patent: Apr. 6, 2010

(54) POLYMER-ZEOLITE NANOCOMPOSITE MEMBRANES FOR PROTON-EXCHANGE-MEMBRANE FUEL CELLS

(75) Inventors: Yushan Yan, Riverside, CA (US); Brett Holmberg, Riverside, CA (US); Xin Wang, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 1374 days.

(21) Appl. No.: 10/982,708

(22) Filed: Nov. 4, 2004

(65) Prior Publication Data

US 2006/0034757 A1 Feb. 16, 2006

Related U.S. Application Data

(60) Provisional application No. 60/518,406, filed on Nov. 7, 2003.

(51) Int. Cl.
*H01M 8/10* (2006.01)
*B05D 5/12* (2006.01)

(52) U.S. Cl. .............................. 429/33; 429/30; 427/115

(58) Field of Classification Search ................ 429/33, 429/30; 427/115
See application file for complete search history.

(56) References Cited

U.S. PATENT DOCUMENTS 5,211,984 A * 5/1993 Wilson ...................... 427/115
6,117,581 A * 9/2000 Shelef ......................... 429/44
6,391,486 B1 * 5/2002 Narayanan et al. ........... 429/40

OTHER PUBLICATIONS

Antonucci, P.L. et al., "Investigation of a direct methanol fuel cell based on a composite Nafion® -silica electrolyte for high temperature operation," *Solid State Ionics*, 1999, vol. 125, pp. 431-437.
Antonucci, V. et al., "Polymer-silica composite membranes for Direct Methanol Fuel Cells," *Studies in Surface Science and Catalysis*, 2001, vol. 140, pp. 37-45.
Aricó, A.S. et al., "Comparison of Ethanol and Methanol Oxidation in a Liquid-Feed Solid Polymer Electrolyte Fuel Cell at High Temperature," *Electrochemical and Solid State Letters*, 1998, vol. 1, No. 2, pp. 66-68.
Chen, T-Y. et al., "Ion Exchange Capacity of Nafion and Nafion Composites," *Langmuir*, 2000, vol. 16, No. 6, pp. 2866-2871.
Dillon, R. et al., "International activities in DMFC R&D: status of technologies and potential applications," *Journal of Power Sources*, 2004, vol. 127, pp. 112-126.
Jones, C.W. et al., "Organic-functionalized molecular sieves as shape-selective catalysts," *Nature*, May 7, 1998, vol. 393, pp. 52-54.
Sone, Y. et al., "Proton Conductivity of Nafion 117 as Measured by a Four-Electrode AC Impedance Method," *Journal of the Electrochemical Society*, Apr. 1996, vol. 143, No. 4, pp. 1254-1259.
Szentirmay, M.N. et al., "A Solution Processing Procedure for Producing High Quality Solution-Cast Nafion and Other PFSI Films," *Journal of the Electrochemical Society*, Aug. 1986, vol. 133, p. C332, Abstract No. 594.
Tricoli, V., "Proton and Methanol Transport in Poly(perfluorosulfonate) Membranes Containing $Cs^+$ and $H^+$ Cations," *Journal of the Electrochemical Society*, Nov. 1998, vol. 145, No. 11, pp. 3798-3801.
Wang, H. et al., "High-surface-area zeolitic silica with mesoporosity," *Journal of Materials Chemistry*, 2001, vol. 11, pp. 2307-2310.
Wang, H. et al., "Nafion-bifunctional silica composite proton conductive membranes," *Journal of Materials Chemistry*, 2002, vol. 12, pp. 834-837.
Zawodzinski, T.A., Jr. et al., "Water Uptake by and Transport Through Nafion® 117 Membranes," *Journal of the Electrochemical Society*, Apr. 1993, vol. 140, No. 4, pp. 1041- 1047.
Zawodzinski, T.A., Jr. et al., "Characterization of polymer electrolytes for fuel cell applications," *Solid State Ionics*, 1993, vol. 60, pp. 199-211.
Zimmerman, C.M. et al., "Tailoring mixed matrix composite membranes for gas separations," *Journal of Membrane Science*, 1997, vol. 137, pp. 145-154.

* cited by examiner

*Primary Examiner*—Patrick Ryan
*Assistant Examiner*—Julian Mercado
(74) *Attorney, Agent, or Firm*—Townsend and Townsend and Crew LLP (57) ABSTRACT

A suite of polymer/zeolite nanocomposite membranes. The polymer backbone is preferably a film forming fluorinated sulfonic acid containing copolymer, such as a Teflon type polymer, a perfluorinated polymer, or a perfluorinated polymer with sulfonic groups. The zeolites formed in accordance with the present invention and which are used in the membranes are plain, phenethyl functionalized and acid functionalized zeolite FAU(Y) and BEA nonocrystals. The zeolite nanocrystals are incorporated into polymer matrices for membrane separation applications like gas separations, and in polymer-exchange-membrane fuel cells. For the purpose of developing zeolite-polymer nanocomposite membranes, the zeolite nanocrystals are size-adjustable to match the polymer-network dimensions.

11 Claims, 5 Drawing Sheets

POLYMER-ZEOLITE NANOCOMPOSITE MEMBRANES FOR PROTON-EXCHANGE-MEMBRANE FUEL CELLS

CROSS-REFERENCES TO RELATED APPLICATIONS

The present application claims priority to U.S. Provisional Patent Application No. 60/518,406, filed Nov. 7, 2003, the teachings of which are incorporated herein by reference for all purposes.

BACKGROUND OF THE INVENTION

The present invention relates to the formation of polymer/zeolite nanocomposite membranes, and in particular to using such membranes for fuel cell applications.

Proton exchange membrane fuel cell (PEMFC) systems have been determined to be approximately two to three times as efficient as conventional internal combustion engine (ICE) power systems. The power density, volume and weight of PEMFC systems approach that of an ICE power system, making PEMFC systems ideal for transportation applications. Prototype PEMFC vehicles have shown that hydrogen fed, PEMFC powered vehicles are capable of performance comparable with ICE vehicles in all respects, however the cost of a mass produced PEMFC system is currently 10 times greater than a comparable ICE power system, and no national hydrogen refueling network exists. Fuel cell cost is expected to come down as the technology is developed further, but the costs associated with developing a hydrogen distribution network would be tremendous.

However, there would be no need for a new national distribution network, if either reformed hydrogen or methanol fed PEMFC powered vehicles were used, because a liquid hydrocarbon (gasoline) distribution network is already in place. PEMFCs can be run on hydrogen gas generated by reforming a liquid hydrocarbon fuel such as methanol, ethanol or gasoline, as long as carbon monoxide levels in the hydrogen feed stream are reduced to less than 10 ppm. Use of feed hydrogen with more than 10 ppm CO causes anode catalyst poisoning and fuel cell performance suffers. Unfortunately, system bulk and complexity required to reduce CO levels in the hydrogen feed gas to 10 ppm during steady operation and 100 ppm during transient operation makes it impractical for use in a vehicle. Interestingly, use of both reformed hydrogen fed PEMFC power plants could be realized if the temperature operation range of their proton exchange membrane material was extended from 80° C. up to 140° C. CO tolerance of the PEMFC anode catalyst has been shown to increase greatly with temperature, and would eliminate the need for bulky CO removal equipment for the reformed hydrogen feed stream. In addition, higher temperature operation can also facilitate thermal management/heat utilization of the fuel cell stack, and potentially simplify fuel cell water management. However, current proton exchange membranes are not suitable for operation at these temperatures due to dehydration problems and mechanical instability. One of the major technology breakthroughs required for PEMFCs is a membrane material that operates at higher temperatures.

Direct methanol fuel cells (DMFCs), which take liquid methanol instead of $H_2$ fuel, enjoy a competitive advantage over $H_2$-air fuel cell system in terms of the refueling infrastructure, storage/transport system and safety concerns. DMFC is especially promising for powering portable electronics such as cell phones and laptop computers. The crossover of methanol through the polymer electrolyte membrane and the low activity of the reported Pt based catalyst for methanol oxidation limit performance of DMFCs and restrict their potential applications. In terms of methanol crossover, besides the loss of fuel, another disadvantage is that it will lead to a significant performance loss due to the formation of "mixed potentials", as a result of concurring of oxygen reduction and methanol oxidation on the Pt cathode electrocatalysts.

Experimental results show that methanol crossover through Nafion membrane leads to a significant performance loss in DMFC and this phenomenon is more severe with the increase of methanol feed concentration. Therefore, there exists a need to develop a composite membrane that is able to reduce the methanol crossover while still maintaining its high proton conductivity; a membrane that is able to combine the high proton conductivity of a polymer with the hydration and mechanical stability of an inorganic material in order to get a membrane capable of elevated (e.g., 140° C.) operation.

One promising strategy for efficient proton conduction and methanol blocking at elevated temperatures is to incorporate inorganic nanoparticles inside the membrane. Previous attempts were based on the idea of combining the high proton conductivity of Nafion with the thermally stable, hydrophilic material, such as silica, in order to maintain hydration at high temperatures and to physically block methanol crossover. However, introducing silica dilutes the sulfonic acid number concentration, resulting in a loss in membrane proton conductivity. An ideal composite membrane additive would be able to increase the proton concentration, while still improving hydration/mechanical properties and blocking methanol crossover at high temperatures.

BRIEF SUMMARY OF THE INVENTION

The present invention is directed towards a suite of polymer/zeolite nanocomposite membranes. The polymer backbone is preferably a film forming fluorinated sulfonic acid containing copolymer, such as a TEFLON (polytetrafluoroethylene) type polymer, perfluorinated polymer, or perfluorinated polymer with sulfonic groups. The zeolites formed in accordance with the embodiments of the present invention and which are used in the membrane are plain, phenethyl functionalized and acid functionalized zeolite FAU(Y) and BEA nanocrystals. The zeolite nanocrystals are incorporated into polymer matrices for membrane separation applications like gas separations, and in polymer-exchange-membrane fuel cells. For the purpose of developing zeolite-polymer nanocomposite membranes, the zeolite nanocrystals are size-adjustable to match polymer-network dimensions.

The polymer-zeolite nanocomposite membranes in accordance with the embodiments of the present invention take advantage of the molecular sieving and proton conductivity of sulfonic acid functionalized zeolite nanocrystals. Results indicate that the methanol crossover of the 5 wt % nanocomposite membranes is 45% lower and proton conductivity is 17% higher than a commercial Nafion 117 membrane at 80° C. and 100% relative humidity. The nanocomposite membranes in accordance with the embodiments of the present invention have the potential to maintain high proton conductivity and low methanol crossover at temperatures up to 140° C.; improving anode kinetics, reducing anode CO poisoning, improving methanol oxidation efficiency, and reducing cathode overpotentials in PEMFCs.

For a further understanding of the nature and advantages of the invention, reference should be made to the following description taken in conjunction with the accompanying drawings.

DETAILED DESCRIPTION OF THE INVENTION

I. Definitions

Unless defined otherwise, all technical and scientific terms used herein have the meaning commonly understood by a person skilled in the art to which this invention belongs. As used herein, the following terms have the meanings ascribed to them unless specified.

Zeolites are catalytic and separation materials that can have nanostructures on the same scale as the molecules that react and adsorb within their pores. Their nanostructure is a function of the conditions under which they are created, and because of the molecular scale of the catalytic and separation surfaces, their macroscopic properties are thus a function of those same conditions.

Zeolites are microporous crystalline oxides with a high surface to volume ratio. They are aluminosilicates of form M$_x$*(Si$_{(1-x)}$+Al$_x$)O$_2$*yH$_2$O, (Here M is monovalent metal ion) but may also include many zeolite-like materials that are also microporous, such as aluminophosphates, zincosilicates, and titanosilicates. Zeolites are actually natural products. Not all naturally occurring zeolites have been recreated in the laboratory, and conversely, many zeolites have been synthesized that do not occur in nature. Zeolite synthesis is not similar to synthetic organic chemistry. The zeolite is assembled through a series of non-equilibrium molecular recognition events that cannot be understood in the same dot-and-arrow schema that synthetic organic schemes are constructed from. In fact, this process is still not well understood.

OFMS—Organic Functionalized Molecular Sieves. In order to try to broaden the types of reactions that microporous and mesoporous materials can catalyze, researchers would like to be able to chemically functionalize their materials. Although this notion has been successful to some extent, for instance in the case of grafting organosilanes that contain organic functional groups onto the internal surfaces of mesoporous materials, there has been little success repeating the process for microporous materials.

Electrolytes: The "electrolyte" is that part of any fuel cell that separates the anode and the cathode. Positively and negatively charged species (e.g., protons and electrons in a PEMFC) are formed by catalysis of the fuel (hydrogen) at the anode, and the electrolyte allows the protons but not the electrons to pass through to the cathode, and forcing the electrons to reach the cathode through an external circuit where the electrons can do work as electricity. The electrolyte used is what gives a particular type of fuel cell its name: alkaline, molten carbonate, phosphoric acids, PEM, solid oxide, etc.

Proton Exchange Membrane Fuel Cell (PEMFC): Proton exchange membrane (PEM) fuel cells work with a polymer electrolyte in the form of a thin sheet. This membrane is small and light, and it works at low temperatures (about 80 degrees C., or about 175 degrees F.). Other electrolytes such as solid oxide fuel cell electrolyte can require temperatures as high as 1,000 degrees C. Catalysts are used at both the anode and cathode on either side of the membrane to carry out the necessary reactions for the fuel cell to generate electricity. Hydrogen molecules are stripped of their electrons at the anode, and the positively charged protons diffuse through polymer membrane and migrate toward the cathode. The electrons pass from the anode to the cathode through an exterior circuit and perform electrical work along the way. At the cathode, the electrons, protons and oxygen from the air combine to form water. For the fuel cell to work, the proton exchange membrane electrolyte must allow protons to pass through but prohibit the conduction of electrons and permeation of gases.

II. Methods of Forming Polymer/Zeolite Nanocomposite Membranes

Embodiments of the present invention are directed towards a suite of polymer/zeolite nanocomposite membranes. The polymer backbone is preferably a film forming fluorinated sulfonic acid containing copolymer, such as a TEFLON type polymer, perfluorinated polymer, and perfluorinated polymer with sulfonic groups. The zeolites used in the membrane are plain, phenethyl functionalized and acid functionalized zeolite FAU(Y) and BEA nanocrystals. The zeolite nanocrystals are incorporated into polymer matrices for membrane separation applications like gas separations, and in polymer-exchange-membrane fuel cells. For the purpose of developing zeolite-polymer nanocomposite membranes, it is also desirable that zeolite nanocrystals are size-adjustable to match polymer-network dimensions.

The following examples are provided to illustrate the embodiments of the present invention. They are not intended to limit the scope of this disclosure to the embodiments exemplified therein. All ranges for all parameters disclosed are inclusive of the range limits.

EXAMPLE

Preparation of Colloidal Zeolite FAU(Y) Nanocrystals

The preparation scheme for hydrothermal synthesis of colloidal suspensions of zeolite FAU(Y) nanocrystals is described below. First a 250 mL polypropylene bottle containing a magnetic stir bar was washed with double deionized water (DDI H$_2$O) using ultrasonication. Then appropriate amounts of double deionized water (DDI H$_2$O), 25 wt % aqueous tetramethylammonium hydroxide solution (TMAOH), and aluminum isopropoxide (97 wt %) were added, in that order, and stirred vigorously until the solution became clear. Tetramethylammonium bromide (TMABr, 98 wt %) was then added to the clear solution and stirred until completely dissolved. Aqueous 30 wt % colloidal silica (Ludox HS-30, $SiO_2/Na_2O=90$, wt % $SiO_2=29.90$, wt % $Na_2O=0.34$) was then added to complete the solution, and the bottle was sealed tightly. The molar composition of the synthesis solution in general was 1.00 $Al_2O_3$: 4-5 $SiO_2$: 2-3 $(TMA)_2O$ $(2OH^-)$: 0-3 $(TMA)_2O(2Br^-)$: 0.044-0.055 $Na_2O$: 200-300 $H_2O$. After each batch was sealed, it was aged for 3 days at room temperature (RT) with vigorous stirring, and was then heated with stirring in a 100° C. oil bath. Periodic 10 mL samples were taken during the synthesis by quickly opening, sampling, and resealing the bottle. All samples were washed by three repetitions of centrifugation with relative centrifugal force of 48,500 g for 2 hours; then decanting, and redispersion in DDI $H_2O$ with ultrasonication before analyses preparations were performed. Centrifugations were performed in a Beckman J2-HS centrifuge at 20,500 rpm using a JA-21 rotor.

Using the above procedure, zeolite nanocrystals are synthesized using tetramethyl ammonium bromide (TMABr) as an additional organic template. An example solution composition is 1.00 $Al_2O_3$-4.35 $SiO_2$-2.40 $(TMA)_2O(2OH^-)$-1.2 $(TMA)_2O(2Br^-)$-0.048 $Na_2O$-249.00 $H_2O$, with a weight composition of 76.5 g DDI $H_2O$, 52.3 g TMAOH, 11.3 g TMABr, 12.5 g aluminum isopropoxide, and 26.2 g Ludox HS-30.

Figure 2:
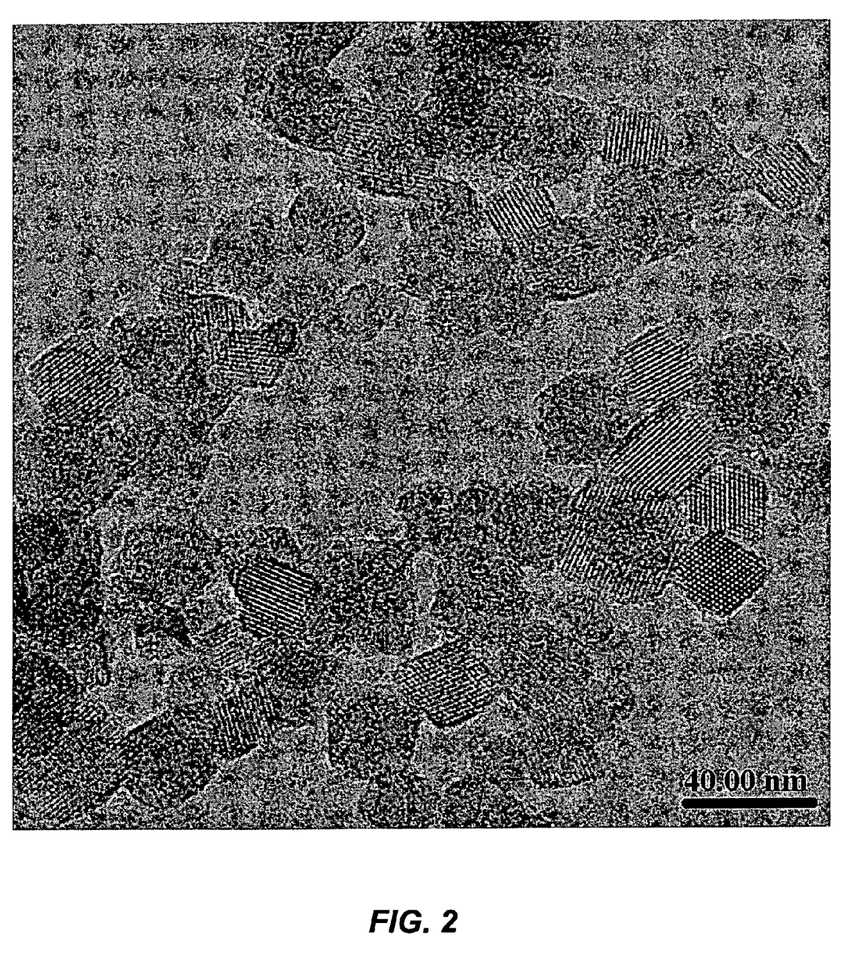
FIG. 2 is a transmission electron microscopy image of the size controlled zeolite FAU(Y) nanocrystals.

Using this method, average nanocrystal size is controllable in the range of 32-45 nm by manipulating tetramethylammonium concentration and anion concentration. A transmission electron microscopy image of the size controlled zeolite FAU(Y) nanocrystals is provided in FIG. 2 The average particle size of the crystals in the TEM image is 32 nm, which agreed very well with the 33 nm average particle size obtained during dynamic light scattering particle analyses on the same sample. By using this method, a high nanocrystal yield was obtained. For example, crystals hydrothermally synthesized with a 1.00 $Al_2O_3$-4.35 $SiO_2$-2.40 $(TMA)_2O(2OH-)$-1.2 $(TMA)_2O(2Br-)$-0.048 $Na_2O$-249.00 $H_2O$ (T3.6) solution composition were 45% smaller by volume after 54 hours of crystallization at 100° C. and were obtained with approximately 73% more yield (g zeolitic $Al_2O_3+SiO_2$/g synthesis $Al_2O_3+SiO_2$) than crystals synthesized with a 1.00 $Al_2O_3$-4.35 $SiO_2$-2.40 $(TMA)_2O(2OH-)$-0.048 $Na_2O$-249.00 $H_2O$ (T2.4) composition. After 216 hours, T3.6 syntheses contained 37 nm crystals with 180% higher yield than that of T2.4 syntheses at 54 hours (38 nm crystals, 0.044 g zeolitic $Al_2O_3+SiO_2$/g synthesis $Al_2O_3+SiO_2$).

EXAMPLE

Preparation of Phenethyl Functionalized Colloidal Zeolite FAU(Y) Nanocrystals

The preparation scheme for hydrothermal synthesis of phenethyl functionalized colloidal suspensions of zeolite FAU(Y) nanocrystals was as follows: First a 250 mL polypropylene bottle containing a magnetic stir bar was washed with double deionized water (DDI $H_2O$) under ultrasonication. Then appropriate amounts of DDI $H_2O$, 25 wt % aqueous tetramethylammonium hydroxide solution (TMAOH, SACHEM), and aluminum isopropoxide (97 wt %, Aldrich) were added, in that order, and stirred vigorously until the solution became clear. Tetramethylammonium bromide (TMABr, 98 wt %, Fisher) was then added to the clear solution and stirred until completely dissolved. Aqueous 30 wt % colloidal silica (Ludox HS-30, $SiO_2/Na_2O=90$, wt % $SiO_2=29.90$, wt % $Na_2O=0.34$, Aldrich) was then added. Then an appropriate amount of phenethyl trimethoxysilane (PETMS, 98 wt %, Aldrich) was added to complete the solution, and the bottle was sealed tightly. The molar composition of the synthesis solution in general was 1.00 $Al_2O_3$: 3-5 $SiO_2$(HS-30): 0.12-1.45 $SiO_2$(PETMS): 2-3 $(TMA)_2O$ $(2OH^-)$: 0-3 $(TMA)_2O(2Br^-)$: 0.044-0.055 $Na_2O$: 200-300 $H_2O$. After each batch was sealed, it was aged for 3 days at room temperature (RT) with vigorous stirring, and was then heated with stirring in a 100° C. oil bath. Periodic 10 mL samples were taken during the synthesis by quickly opening, sampling, and resealing the bottle.

Using the above procedure, phenethyl functionalized zeolite FAU(Y) nanocrystals are synthesized using tetramethyl ammonium bromide (TMABr) as an additional organic template and PETMS as a functionalized silica source. The composition of an example solution is 1.00 $Al_2O_3$-4.35 $SiO_2$-0.12 $SiO_2$(PETMS)-2.40 $(TMA)_2O(2OH^-)$-1.2 $(TMA)_2O(2Br^-)$-0.048 $Na_2O$-249.00 $H_2O$, with a weight composition of 76.5 g DDI H2O, 52.3 g TMAOH, 11.3 g TMABr, 12.5 g aluminum isopropoxide, 26.2 g Ludox HS-30, and 0.84 g phenethyltrimethoxysilane (PETMS).

Figure 3:
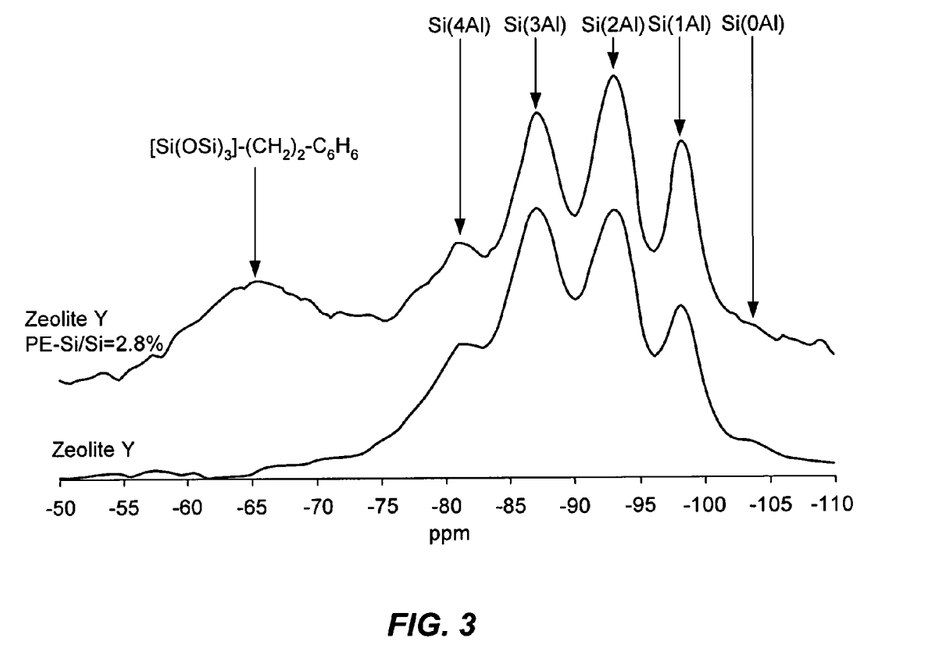
FIG. 3 shows a Si$^{29}$ NMR analysis of the plain and phenethyl functionalized zeolite FAU(Y) nanocrystals. The additional peak located at −65 ppm indicates the presence of zeolite framework Si atoms that are covalently bonded to a phenethyl side chain.

Using this method, phenethyl functionalized zeolite FAU(Y) nanocrystals were formed. Phenethyl functionization was verified using Si magic angle spinning nuclear magnetic resonance spectroscopy ($Si^{29}$ NMR). FIG. 3 shows a $Si^{29}$ NMR analysis of the plain and phenethyl functionalized zeolite FAU(Y) nanocrystals. The additional peak located at −65 ppm indicates the presence of zeolite framework Si atoms that are covalently bonded to a phenethyl side chain. This verifies a proper formation for the phenethyl functionalized zeolite FAU(Y) nanocrystals.

EXAMPLE

Preparation of Phenethyl Functionalized Colloidal Zeolite BEA Nanocrystals

Synthesis of phenethyl functionalized zeolite BEA nanocrystals was conducted using two separate techniques. In the first technique, a 250 mL polypropylene bottle containing a magnetic stir bar was washed with double deionized water (DDI $H_2O$) under ultrasonication. Then appropriate amounts of DDI $H_2O$, 35 wt % aqueous tetraethylammonium hydroxide solution (TEAOH), and aluminum isopropoxide (97 wt %) were added, in that order, and stirred vigorously until the solution became clear. Aqueous 30 wt % colloidal silica (Ludox HS-30, $SiO_2/Na_2O=90$, wt % $SiO_2=29.90$, wt % $Na_2O=0.34$) was then added. The appropriate amount of phenethyl trimethoxysilane (PETMS, 98 wt %, Aldrich) was added to complete the solution, and the bottle was sealed tightly. The final molar composition of any given synthesis solution was 1.00 $Al_2O_3$: 100*(1-x) $SiO_2$(HS-30): 100*(x) $SiO_2$(PETMS): 18 $(TEA)_2O$ $(2OH^-)$: 1.11 $Na_2O$: 1330 $H_2O$. The mole percentage of the total Si in the synthesis mixture provided by PETMS is represented by x. A typical batch weight composition is as follows: (for x=0.005) 76.46 g TEAOH, 12.5 g aluminum isopropoxide, 100.5 g Ludox HS-30, and 0.58 g phenethyl trimethoxysilane (PETMS). After each batch was sealed, it was aged for 2 hours at room temperature (RT) with vigorous stirring, and was then heated with stirring in a 100° C. oil bath. Periodic 10 mL samples were taken for analysis during the synthesis by quickly opening, sampling, and resealing the bottle.

The second technique to synthesize phenethyl functionalized zeolite BEA nanocrystals began with a ten-minute hydrofluoric acid soak of the 35 mL TEFLON liner in a stainless steel cased Parr autoclave. The TEFLON liner was then rinsed and scrubbed thoroughly with Alconox and DDI $H_2O$. Prior to the addition of the reaction mixture to the autoclaves, the mixtures were prepared in polypropylene bottles, with stirring by magnetic bars. Two precursor solutions, one with aluminum and the other containing silica, were prepared for each reaction batch. The aluminum precursor solution was composed of Al powder (99.95% Al) and half of the required TEAOH (35wt%). The silica precursor solution was composed of the remaining half of the recipe's TEAOH, DDI $H_2O$, fumed silica, and phenethyl trimethoxysilane (PETMS, 99.8%). Both solutions were stirred vigorously until the aluminum solution became clear, indicating the complete hydrolyzation of the aluminum powder. The solutions were mixed together in one bottle for 1 hour at room temperature, and then poured into a TEFLON liner, and sealed inside a stainless steel autoclave. The final molar composition of any given synthesis solution was 1.00 $Al_2O_3$: $(v*(1-w))$ $SiO_2$(fumed silica): $(v*w)$ $SiO_2$(PETMS): $(0.26*v+1)$ $(TEA)_2O$ $(20H^-)$: $(15*v)$ $H_2O$. The total $SiO_2/Al_2O_3$ ratio is represented by the symbol v. The mole percentage of total Si in the synthesis mixture provided by PETMS is represented by w. A typical batch weight composition is as follows: (for v=25, w=2.8%), 20.15 g TEAOH, 0.1646 g aluminum powder, 4.96 g fumed $SiO_2$, and 0.54 g PETMS. The autoclave was then inserted into a custom tumbling apparatus spinning end over end at 70 revolutions per minute within a convection oven at 140° C. Reaction times as long as 14 days were required for batches with v=25.

All samples were washed by three repetitions of centrifugation with relative centrifugal force of 48,500 g for 2 hours; then decanting, and redispersion in DDI $H_2O$ with ultrasonication before analyses preparations were performed. Centrifugations were performed in a Beckman J2-HS centrifuge at 20,500 rpm using a JA-21 rotor.

Using this method the final molar composition of a synthesis solution based on colloidal silica was in general about 1.00 $Al_2O_3$: 50-200*(1-x) $SiO_2$(HS-30): 50-200*(x) $SiO_2$ (PETMS): 18 $(TEA)_2O$ $(2OH^-)$: 0.55-2.22 $Na_2O$: 1000-1500 $H_2O$, x was varied between 0.005 and 0.25. And an example solution composition was 1.00 $Al_2O_3$: 100*(1-x) $SiO_2$(HS-30): 100*(x) $SiO_2$(PETMS): 18 $(TEA)_2O$ $(2OH^-)$: 1.11 $Na_2O$: 1330 $H_2O$, where x equals 0.005, with the weight composition as follows: (for x=0.005) 76.46 g TEAOH, 12.5 g aluminum isopropoxide, 100.5 g Ludox HS-30, and 0.58 g phenethyl trimethoxysilane (PETMS).

Figure 4:
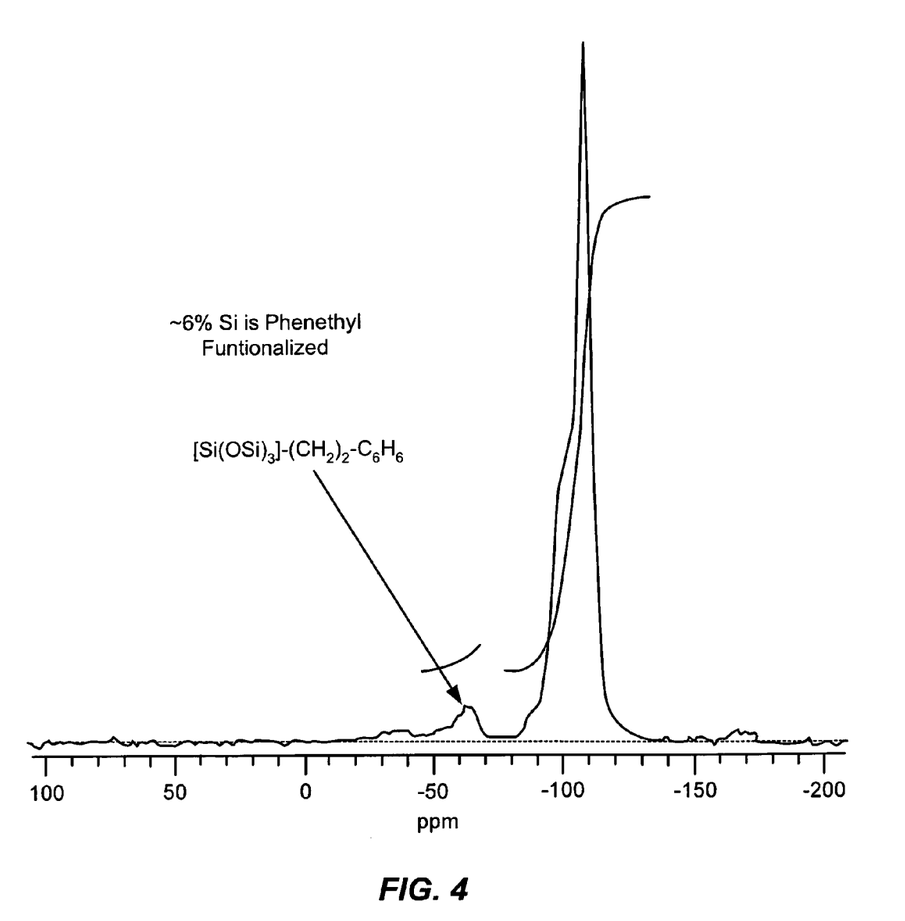
FIG. 4 shows a Si$^{29}$ NMR analysis of the phenethyl functionalized zeolite BEA nanocrystals. The peak located at −65 ppm indicates the presence of zeolite framework Si atoms that are covalently bonded to a phenethyl side chain.
Figure 5:
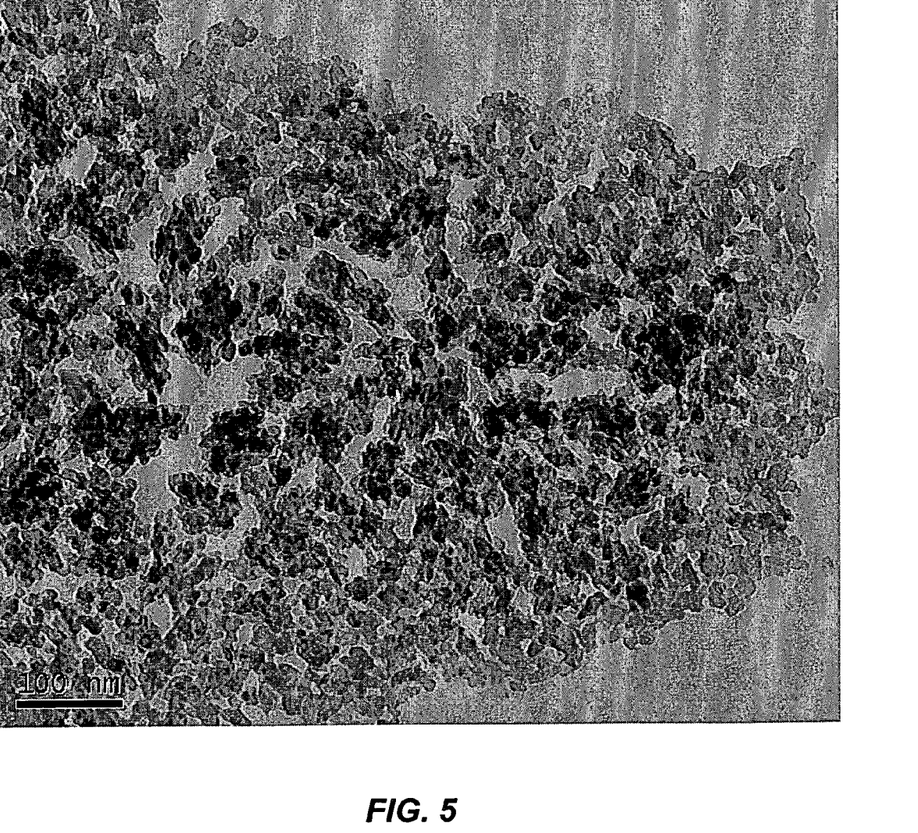
FIG. 5 shows a transmission electron microscopy image of the phenethyl functionalized zeolite BEA nanocrystals synthesized with the following composition 1.00 Al$_2$O$_3$: (v*(1−w)) SiO$_2$(HS-30): (v*w) SiO$_2$(PETMS): (0.26*v+1) (TEA)$_2$O (2OH$^-$): (15*v) H$_2$O, where v=25, and w=0.028.

Using this method the molar composition of a synthesis solution based on fumed silica was in general about 1.00 $Al_2O_3$: $(v*(1-w))$ $SiO_2$(fumed silica): $(v*w)$ $SiO_2$(PETMS): $(0.26*v+1)$ $(TEA)_2O$ $(2OH^-)$: $(15*v)$ $H_2O$, where the total $SiO_2/Al_2O_3$ ratio is represented by the symbol v, and the mole percentage of total Si in the synthesis mixture provided by PETMS is represented by w. v was varied between 16 and 400 and w was varied between 0.01 and 0.20. An example solution with composition (for v=25, w=0.028) consisted of 20.15 g TEAOH, 0.1646 g aluminum powder, 4.96 g fumed $SiO_2$, and 0.54 g PETMS. Phenethyl functionization was verified using Si magic angle spinning nuclear magnetic resonance imaging spectroscopy ($Si^{29}$ NMR). FIG. 4 shows a $Si^{29}$ NMR analysis of the phenethyl functionalized zeolite BEA nanocrystals. The peak located at −65 ppm indicates the presence of zeolite framework Si atoms that are covalently bonded to a phenethyl side chain. This verifies the proper formation of the phenethyl functionalized zeolite BEA nanocrystals. Using peak area analysis it can also be concluded that approximately 6% of the Si atoms in the zeolite framework have phenethyl side chains. FIG. 5 is a transmission electron microscopy image of Phenethyl functionalized zeolite BEA nanocrystals synthesized with the following composition 1.00 $Al_2O_3$: $(v*(1-w))$ $SiO_2$ (fumed silica): $(v*w)$ $SiO_2$(PETMS): $(0.26*v+1)$ $(TEA)_2O$ $(2OH^-)$: $(15*v)$ $H_2O$, where v=25, and w=0.028.

EXAMPLE

Preparation of Acid Functionalized Colloidal Zeolite Nanocrystals

After synthesis of the phenethyl functionalized zeolite FAU(Y) and BEA, sulfonic acidification of the phenethyl groups was accomplished. To accomplish this effectively, the organic template (e.g., TMA and TEA) used during the nanocrystal syntheses had to be removed from the zeolite framework. This had to be performed without damaging or agglomerating the crystals. Due to the high aluminum content of the zeolite FAU(Y) nanocrystals, mild pH ion exchangers like $NaNO_3$ or $NH_4NO_3$ were used. The zeolite FAU(Y) ion exchanges were accomplished with 2 wt % zeolite solid loading in the ion exchange solution and either 1M $NaNO_3$ or $NH_4NO_3$ as the ion exchanger at 90° C. with magnetic bar stirring in a temperature-controlled bath. Once the template was removed, sulfonic acid groups were added to the phenethyl side chains of the functionalized zeolite FAU(Y), while maintaining the dispersability of the nanocrystals. First, the zeolite FAU(Y) nanocrystals were dealuminated to increase their acid stability by exchanging framework Al with Si using an ammonium hexafluorosilicate (AHFS) treatment in a ammonium acetate buffered suspension The second step of this technique requires the dealuminated, functionalized zeolite to be dispersed in a chlorinated solvent such as methylene chloride in an anhydrous atmosphere. Sulfonation of the phenethyl functionalized zeolite Y nanocrystals was then performed with trimethyl silyl chlorosulfonate $[(CH_3)_3SiSO_3Cl]$ in the chlorinated solvent suspension, then the nanocrystals were treated with sodium methoxide to obtain their sodium form, which was then dispersed in DMF and converted to acid form by titration with hydrochloric acid.

The high silica zeolite BEA nanocrystal material was resistant to acid conditions, and could withstand 100° C. treatments with concentrated sulfuric acid in order to remove the organic template, while maintaining significant crystallinity. This allowed both the template removal and the sulfonic acidification of the zeolite BEA nanocrystals to occur during the same concentrated sulfuric acid treatment. After sulfonic acidification of the zeolite BEA nanocrystals, the amount of sulfonic acid groups attached to the zeolite was determined to be $1.0076*10^{-3}$ mol $SO_3H$ per gram of zeolite by using 0.050 M NaOH titration technique with a phenolthalein indicator. This translates to an equivalent weight of 992 g zeolite per mol $SO_3H$. This compares favorably with the equivalent weight of the Nafion (equivalent weight=1100 g Nafion per mol $SO_3H$) used to make some of the nanocomposite membranes.

EXAMPLE

Preparation of Polymer/Zeolite Nanocomposite Membrane

Zeolite Nanocrystal Synthesis

Zeolite FAU(Y) nanocrystals were synthesized according the methods disclosed above. Plain and phenethyl linked sulfonic acidified zeolite BEA nanocrystal were synthesized according to the methods disclosed above. Once synthesized, the clean zeolite nanocrystals were centrifuged at 48,500 g for 2 hours, the water in which they previously were dispersed in was removed, and then the nanocrystals were redispersed in ethanol.

Membrane Casting

Membranes were cast in custom-made glass vessels. These vessels were composed of an aluminum fixture designed to compress a glass cylinder onto a flat plate glass bottom with a TEFLON tape seal. Initial membranes that were cast in petri dishes and glass beakers had thickness variations because those vessels were not flat-bottomed. Accuracy of the membrane characterization depends upon uniform membrane thickness, so casters with flat bottoms were a necessity. In general, the following membrane casting technique was followed. The source of polymer was a Nafion suspension from Dupont. Zeolite nanocrystals in ethanol suspension were added to the Nafion suspension and the solvent composition of the mixture was augmented to achieve ideal membrane casting conditions. Following are examples of successful recipes for casting homogenous zeolite/polymer nanocomposite membranes.

Homogenous nanocomposite membranes with zeolite Y nanocrystals and Nafion were cast in the $H^+$ form using the following procedure. Plain zeolite Y nanocrystals were first ion exchanged using a 12 hour aqueous 1M $NaNO_3$ treatment at 80° C. with stirring in order to remove the template $TMA^+$ from the supercages in micropore structure of the zeolite nanocrystals. After ion exchange, the zeolite Y nanocrystals were centrifuged 3 times with relative centrifugal force of 48,500 g for 2 hours. After the first two centrifugations, the zeolite Y nanocrystals were redispersed in DDI $H_2O$. After the third centrifugation, the zeolite Y nanocrystals were dispersed in ethanol (200 proof). Centrifugations were performed in a Beckman J2-HS centrifuge at 20,500 rpm using a JA-21 rotor. The resulting zeolite Y suspension contained 1.15 wt % zeolite Y nanocrystals in ethanol. The original Nafion solution obtained from Du Pont (referred to as "raw Nafion" from now on) was composed of 5 wt % Nafion polymer (1100 equivalent weight), <5% methanol, 30-60% water, 15-30% 1-propanol, and 15-30% 2-propanol. The raw Nafion solution was in its acid counterbalanced ($H^+$) form. The raw Nafion solvent composition led to poor membrane casting, therefore a Nafion/ethanol suspension was generated by first drying raw Nafion solution. The dry Nafion was then treated with 25 wt % nitric acid (aqueous) at 80° C. for 2 hours, followed by repeated rinsing with DDI $H_2O$. The Nafion ($H^+$-form) was then put into ethanol (200 proof) and stirred in a temperature bath at 80° C. to redisperse the polymer. The resulting Nafion in ethanol suspension consisted of 7.8 wt % Nafion and 92.2 wt % ethanol. The final membrane casting composition to yield a 10 wt % zeolite Y in Nafion membrane with thickness of approximately 180 micrometers in a cylindrical glass casting vessel of inner diameter 66 millimeters is as follows: 13.62 g of 7.8 wt % Nafion in ethanol, 10.26 g of 1.15 wt % zeolite Y in ethanol. The final suspension contained 1.0620 g Nafion, 0.1180 g zeolite Y, and 22.6933 g ethanol. The casting vessel was then covered with a watch glass and then put on a level surface in a vacuum desiccator operating at room temperature. The casting vessel was removed when the solvent was completely removed from the casting suspension. Solvent removal required 3-4 days. The casting vessel was then put in a convection oven for one day at 140° C. for the final temperature treatment of the cast membrane.

Homogenous nanocomposite membranes with plain zeolite BEA nanocrystals and Nafion were cast in the $H^+$ form using the following procedure. Plain zeolite BEA nanocrystals were first ion exchanged using a 12 hour 96 wt % sulfuric acid treatment (2 wt % zeolite) at 80° C. with stirring in order to remove the template $TEA^+$ from the micropore structure of the zeolite nanocrystals. After ion exchange, the zeolite BEA nanocrystals were centrifuged 3 times with relative centrifugal force of 48,500 g for 2 hours. After the first two centrifugations, the zeolite BEA nanocrystals were redispersed in DDI $H_2O$. After the third centrifugation, the zeolite BEA nanocrystals were dispersed in ethanol (200 proof). Centrifugations were performed in a Beckman J2-HS centrifuge at 20,500 rpm using a JA-21 rotor. The resulting zeolite BEA suspension contained 0.57 wt % zeolite BEA nanocrystals in ethanol. The original Nafion solution obtained from Du Pont (referred to as "raw Nafion") was composed of 5 wt % Nafion polymer (1100 equivalent weight), <5% methanol, 30-60% water, 15-30% 1-propanol, and 15-30% 2-propanol. The raw Nafion solution was in its acid counterbalanced ($H^+$) form. The raw Nafion solvent composition led to poor membrane casting, therefore a Nafion/ethanol suspension was generated by first drying raw Nafion solution. The dry Nafion was then treated with 25 wt % nitric acid (aqueous) at 80° C. for 2 hours, followed by repeated rinsing with DDI $H_2O$. The Nafion ($H^+$-form) was then put into ethanol (200 proof) and stirred in a temperature bath at 80° C. to redisperse the polymer. The resulting Nafion in ethanol suspension consisted of 7.8 wt % Nafion and 92.2 wt % ethanol. The final membrane casting composition to yield a 5 wt % zeolite BEA in Nafion membrane with thickness of approximately 180 micrometers in a cylindrical glass casting vessel of inner diameter 66 millimeters is as follows: 14.37 g of 7.8 wt % Nafion in ethanol, 10.35 g of 0.57 wt % zeolite BEA in ethanol, and 24.7227 g N,N-DMF. N,N-DMF acts as a high boiling aprotic cosolvent that helps cast homogenous membranes using plain zeolite BEA. The final suspension contained 1.1210 g Nafion, 0.05990 g zeolite BEA, 23.5427 g ethanol, and 24.7227 g N,N-DMF. The casting vessel was then covered with a watch glass and then put on a level surface in a convection oven operating at 80° C. for 2 days, followed by increasing the oven temperature to 100° C. for about 3 days or until all solvent has be removed, and then finally increasing the temperature to 140° C. for one day for the final temperature treatment of the cast membrane.

Homogenous nanocomposite membranes with acid functionalized zeolite BEA nanocrystals and Nafion were cast in the $H^+$ form using the following procedure. Phenethyl functionalized zeolite BEA nanocrystals were first ion exchanged and acidified using a 12 hour 96 wt % sulfuric acid treatment at 80° C. with stirring in order to remove the template $TEA^+$ from the micropore structure of the zeolite nanocrystals, while at the same time adding $SO_3H$ groups to the organic side chains located on the phenethyl functionalized zeolite BEA. After ion exchange, the acidified zeolite BEA nanocrystals were centrifuged 3 times with relative centrifugal force of 48,500 g for 2 hours. After the first two centrifugations, the acidified zeolite BEA nanocrystals were redispersed in DDI $H_2O$. After the third centrifugation, the acidified zeolite BEA nanocrystals were dispersed in ethanol (200 proof). Centrifugations were performed in a Beckman J2-HS centrifuge at 20,500 rpm using a JA-21 rotor. The resulting acidified zeolite BEA suspension contained 0.68 wt % acidified zeolite BEA nanocrystals in ethanol. The original Nafion solution obtained from Du Pont (referred to as "raw Nafion") was composed of 5 wt % Nafion polymer (1100 equivalent weight), <5% methanol, 30-60% water, 15-30% 1-propanol, and 15-30% 2-propanol. The raw Nafion solution was in its acid counterbalanced ($H^+$) form. The raw Nafion solvent composition led to good membrane casting with acidified zeolite BEA nanocrystals when N,N DMF was used as a cosolvent. N,N-DMF acts as a high boiling aprotic cosolvent that helps cast homogenous membranes when using raw Nafion solutions. The final membrane casting composition to yield a 5 wt % acidified zeolite BEA in Nafion membrane with thickness of approximately 180 micrometers in a cylindrical glass casting vessel of inner diameter 66 millimeters is as follows: 22.42 g of 5 wt % raw Nafion, 8.68 g of 0.68 wt % zeolite BEA in ethanol, and 24.7227 g N,N-DMF. The final suspension contained 1.1210 g Nafion, 0.0590 g acidified zeolite BEA, 8.6175 g ethanol, 21.2990 g raw Nafion solvent mix, and 24.7227 g N,N-DMF. The casting vessel was then covered with a watch glass and then put on a level surface in a convection oven operating at 80° C. for 2 days, followed by increasing the oven temperature to 100° C. for about 3 days or until all solvent has be removed, and then finally increasing the temperature to 140° C. for one day for the final temperature treatment of the cast membrane.

Homogenous nanocomposite membranes with acid functionalized zeolite BEA nanocrystals and Nafion were cast in the $H^+$ form using the following procedure. Phenethyl functionalized zeolite BEA nanocrystals were first ion exchanged and acidified using a 12 hour 96 wt % sulfuric acid treatment at 80° C. with stirring in order to remove the template $TEA^+$ from the micropore structure of the zeolite nanocrystals, while at the same time adding $SO_3H$ groups to the organic side chains located on the phenethyl functionalized zeolite BEA. After ion exchange, the acidified zeolite BEA nanocrystals were centrifuged 3 times with relative centrifugal force of 48,500 g for 2 hours. After the first two centrifugations, the acidified zeolite BEA nanocrystals were redispersed in DDI $H_2O$. After the third centrifugation, the acidified zeolite BEA nanocrystals were dispersed in ethanol (200 proof). Centrifugations were performed in a Beckman J2-HS centrifuge at 20,500 rpm using a JA-21 rotor. The resulting acidified zeolite BEA suspension contained 0.68 wt % acidified zeolite BEA nanocrystals in ethanol. The new Nafion solution obtained from Du Pont (referred to as "Liquion") was composed of 5 wt % Nafion polymer (1100 equivalent weight), 20% water, and 75% isopropanol. The Liquion Nafion solution was in its acid counterbalanced ($H^+$) form. The Liquion solvent composition led to good membrane casting with acidified zeolite BEA nanocrystals. The final membrane casting composition to yield a 5 wt % acidified zeolite BEA in Nafion membrane with thickness of approximately 180 micrometers in a cylindrical glass casting vessel of inner diameter 66 millimeters is as follows: 22.42 g of 5 wt % Liquion and 8.68 g of 0.68 wt % zeolite BEA in ethanol. The final suspension contained 1.1210 g Nafion, 0.0590 g acidified zeolite BEA, 8.6175 g ethanol, 4.4840 g water, and 16.8150 g isopropanol. The casting vessel was then covered with a watch glass and then put on a level surface in a convection oven operating at 50° C. until all solvent has be removed, and then finally increasing the temperature to 140° C. for one day for the final temperature treatment of the cast membrane.

N,N DMF can also be used as a cosolvent when casting $H^+$ form membranes using acidified zeolite BEA in ethanol and Liquion suspensions, and it has been shown to increase the amount of zeolite loading possible in a cast homogenous membrane. For example, a homogenous membrane with 20 wt % zeolite in Nafion was cast using the following procedure. The final membrane casting composition to yield a 20 wt % acidified zeolite BEA in Nafion membrane with thickness of approximately 180 micrometers in a cylindrical glass casting vessel of inner diameter 66 millimeters is as follows: 18.88 g of 5 wt % Liquion, 8.61 g of 2.74 wt % zeolite BEA in ethanol, and 27.49 g N,N DMF. The final suspension contained 0.9940 g Nafion, 0.2360 g acidified zeolite BEA, 8.3771 g ethanol, 3.7760 g water, and 14.1600 g isopropanol. The casting vessel was then covered with a watch glass and put on a level surface in a convection oven operating at 80° C. for 2 days, followed by increasing the oven temperature to 100° C. for about 3 days or until all solvent has be removed, and then finally increasing the temperature to 140° C. for one day for the final temperature treatment of the cast membrane.

Homogenous nanocomposite membranes with acid functionalized zeolite BEA nanocrystals and Nafion were cast in the $Na^+$ form using the following procedure. When higher membrane final treatment temperatures are needed the $Na^+$ form of the Nafion polymer is used for its higher thermal stability. Therefore, a direct membrane casting in the $Na^+$ form is necessary in some cases due to the fact that it is challenging to use a membrane treatment after casting to obtain its $Na^+$ form without changing the properties of the membrane. Phenethyl functionalized zeolite BEA nanocrystals were first ion exchanged and acidified using a 12 hour 96 wt % sulfuric acid treatment at 80° C. with stirring in order to remove the template $TEA^+$ from the micropore structure of the zeolite nanocrystals, while at the same time adding $SO_3H$ groups to the organic side chains located on the phenethyl functionalized zeolite BEA. After ion exchange, the acidified zeolite BEA nanocrystals were centrifuged 3 times with relative centrifugal force of 48,500 g for 2 hours. After the first two centrifugations, the acidified zeolite BEA nanocrystals were redispersed in DDI $H_2O$. After the third centrifugation, the acidified zeolite BEA nanocrystals were dispersed in ethanol (200 proof). Centrifugations were performed in a Beckman J2-HS centrifuge at 20,500 rpm using a JA-21 rotor. The resulting acidified zeolite BEA suspension contained 0.68 wt % acidified zeolite BEA nanocrystals in ethanol. The new Nafion solution obtained from Du Pont (referred to as "Liquion") was composed of 5 wt % Nafion polymer (1100 equivalent weight), 20% water, and 75% isopropanol. The Liquion Nafion solution was in its acid counterbalanced ($H^+$) form. The Liquion solvent composition led to good membrane casting with acidified zeolite BEA nanocrystals. After mixing of the Liquion, acidified zeolites, and N,N-DMF, and prior to pouring in the casting vessel, the mixture was titrated to a pH of 7 with ethanol solution saturated with NaOH. This ensured that the Nafion and acidified zeolite were counterbalanced by $Na^+$ ions instead of $H^+$. The final membrane casting composition to yield a 5 wt % acidified zeolite BEA in Nafion membrane with thickness of approximately 180 micrometers in a cylindrical glass casting vessel of inner diameter 66 millimeters is as follows: 22.42 g of 5 wt % Liquion, 8.68 g of 0.68 wt % zeolite BEA in ethanol, and 24.57 g N,N DMF. The final suspension contained 1.1210 g Nafion, 0.0590 g acidified zeolite BEA, 8.6175 g ethanol, 4.4840 g water, 16.8150 g isopropanol, and 24.5733 g N,N DMF. The casting vessel was then covered with a watch glass and put on a level surface in a convection oven operating at 80° C. for 2 days, followed by increasing the oven temperature to 100° C. for about 3 days or until all solvent has be removed, and then finally increasing the temperature to 140° C. for one day for the final temperature treatment of the cast membrane.

After the membrane formation in the oven, the casting vessel was then removed from the oven and allowed to cool (if it was heated to obtain the membrane). Once cool, DDI $H_2O$ was poured in the vessel to loosen the membrane from the glass. To prepare the membrane for characterization, it was first boiled in 3 wt % $H_2O_2$ for one hour then rinsed with boiling DDI $H_2O$. Then it was boiled in a 0.5M sulfuric acid solution for one hour, followed by rinsing with boiling DDI $H_2O$. Finally, the membrane was boiled for 1 hour in DDI $H_2O$, then allowed to cool, after which the membrane was ready for testing.

The proton conductivity of the membrane was determined using 4-electrode AC impedance spectroscopy similar to the technique in (Sone, Y., P. Ekdunge, and D. Simonsson, *Proton conductivity of Nafion* 117 *as measured by a four-electrode AC impedance method*. Journal of the Electrochemical Society, 1996, 143(4):1254-1259.)

The best performance was for a 5 wt % sulfonic acid functionalized zeolite BEA membrane out of all those that were tested at both 21° C. and 77° C. The 5 wt % acid zeolite BEA/polymer nanocomposite membrane possessed a proton conductivity 27% higher than commercial Nafion 117 at 21° C., and 18% higher than commercial Nafion 117 at 77° C.

Methanol crossover was determined using a 2-compartment diffusion cell, similar to the technique in Tricoli, V., *Proton and methanol transport in poly(perfluorosulfonate) membranes containing Cs+ and H+ cations*. Journal of the Electrochemical Society, 1998, 145(11):3798-3801. And the 5 wt % sulfonic functionalized zeolite BEA was the best performing membrane out of all those that were tested at both 21° C. and 77° C. The 5 wt % acid zeolite BEA/polymer nanocomposite membrane possessed a methanol crossover 27% lower than commercial Nafion 117 at 21° C., and 46% lower than commercial Nafion 117 at 77° C.

Likewise, the best proton conductivity/methanol permeability ratio obtained for the 5 wt % sulfonic acid zeolite BEA/Nafion nanocomposite membrane possessed a proton conductivity/methanol permeability ratio 70% high than commercial Nafion 117 at 21° C., and 110% higher than commercial Nafion 117 at 77° C.

EXAMPLE

Preparation of a Proton Exchange Membrane Fuel Cell Using the Membranes

The membrane electrode assemblies were prepared by sandwiching the membrane between two electrodes, and hot-pressing at 135° C./90 atm for 90s. The anode and cathode were prepared according to the procedures reported by Wilson (U.S. Pat. No. 5,211,984 (1993)). The catalyst loadings of anode (40% PtRu/C) and cathode (20% Pt/C) are 1 mg/cm² and 0.4 mg/cm², respectively.

In-situ methanol crossover, proton conductivity (membrane resistance) and polarization curve were electrochemically investigated for plain Nafion and zeolite modified membranes.

Crossover Measurement

Limiting current density of the methanol crossover through the membrane was measured by using the Solartron Electrochemical interface (SI1287) and PCT-2000 fuel cell test station (ElectroChem, USA). The 2M methanol solution was fed to the anodic side of the MEA with 0 psig back pressure while the cathodic side was kept in an inert humidified $N_2$. By applying a dynamic potential at the cathodic side, the methanol permeation flux through the membrane can be expressed by the measured transport-controlled limiting current density of the methanol electro-oxidation process at the Pt/membrane interface of the cathodic side. The true crossover current at open circuit is further obtained after the correction of back electro-osmotic drag. The anode, where hydrogen evolution took place, served as the counter electrode as well as dynamic hydrogen reference electrode (DHE). The experiments were conducted at different temperatures and concentrations to determine their influence on the limiting current density.

Impedance and Polarization Measurement

The same PCT-2000 fuel cell test station was used for the cell polarization testing, except that humidified oxygen was preheated to the cell temperature and fed to the cathode at 200 ml/min with 26 psig back pressure. In-situ membrane resistances were measured by impedance spectroscopy using the Solartron Electrochemical interface (SI1287), Solartron impedance analyzer (SI1260) at a frequency range of 1 Hz~10 kHz.

Results

The tables below summarize the results for the methanol crossover and proton conductivity measurements for DMFCs.

Methanol Crossover Measurement for Direct Methanol Fuel Cell (DMFC)

| Crossover current (A) | 70° C. | 50° C. | 30° C. | 25° C. |
|---|---|---|---|---|
| Nafion 117 (N117-1) | 0.91 | 0.59 | 0.32 | 0.28 |
| modified 2.5% (M2.5-1) | 0.31 | 0.28 | 0.15 | 0.13 |
| modified 5% (M5-1) | 0.37 | 0.34 | 0.21 | 0.19 |
| Improvement (%), M2.5-1 | 66 | 53 | 52 | 53 |
| Improvement (%), M5-1 | 60 | 44 | 44 | 43 |

Both the 2.5% and 5% modified membrane show 40-60% improvement in terms of the blocking of methanol crossover.

Proton Conductivity Measurement for DMFC

| | 70° C. | 50° C. | 30° C. | 25° C. |
|---|---|---|---|---|
| Resistance (Ohm) | | | | |
| N117 | 0.234 | 0.251 | 0.257 | 0.264 |
| M2.5-1 | 0.227 | 0.228 | 0.249 | 0.254 |
| M5-1 | 0.246 | — | — | 0.267 |
| Conductivity (S/cm) | | | | |
| N117 | 0.033 | 0.029 | 0.027 | 0.025 |
| M2.5-1 | 0.039 | 0.039 | 0.031 | 0.030 |
| Improvement (%), M2.5-1 | 17.8 | 33.8 | 17.1 | 18.4 |
| Improvement (%), 5% | No | | | No |

The 2.5% modified membrane shows significant improvements in performance over that of the plain commercial Nafion 117. However, the 5% modified membrane shows no improvement in the proton conductivity.

Polarization Curve Measurement for DMFC

Figure 1:
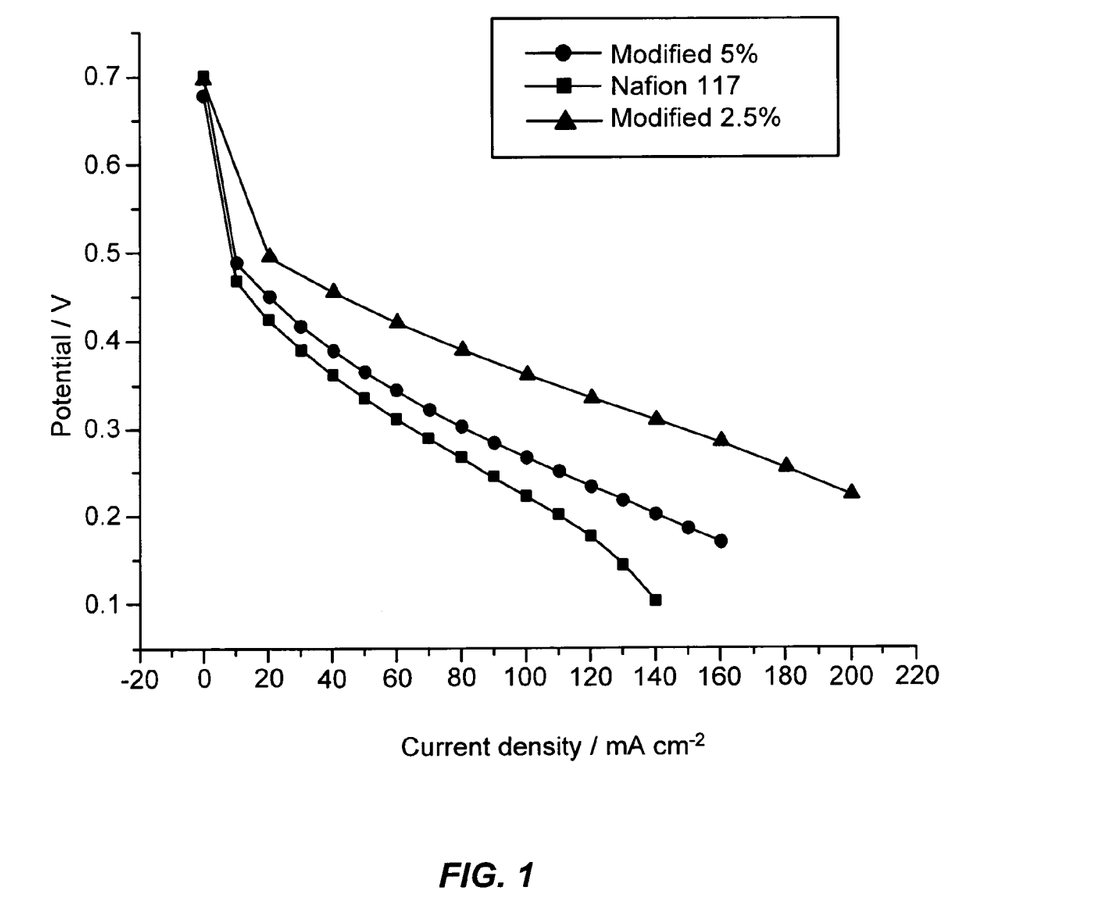
FIG. 1 is the polarization curves for direct methanol fuel cells (DMFCs) with different membranes. Operating condition: 70° C., oxygen pressure 26 psi. anode: 1 mg/cm$^2$ 40% PtRu/C; cathode: 0.5 mg/cm$^2$, 20% Pt/C.

Significant cell performance improvement is observed for acid functionalized zeolite modified membrane as shown in FIG. 1. FIG. 1 is a polarization curve for DMFCs with different membranes, obtained for the following operating conditions: 70° C., oxygen pressure 26 psi; anode: 1 mg/cm² 40% PtRu/C; cathode: 0.5 mg/cm², 20% Pt/C.

The enhanced proton conductivity and lowered methanol crossover compared with Nafion are observed for the zeolite-modified membrane. To explain these, a better understanding about the structure of Nafion is required.

Nafion membrane consists of hydrophobic PTFE backbone and hydrophilic pendant side chains terminated by sulfonate ionic groups. Comprising up to 15% of the polymer, the —SO₃H groups would dissociate in polar solvent and protonate the solvent. Experimental results suggest that the negatively charged —SO$_3^-$ groups, along with water molecules and protons, tend to aggregate and form hydrophilic clusters, which are either dispersed in the continuous hydrophobic PTFE matrix or form a continuous phase and interpenetrate with the PTFE matrix, depending on the hydration level. The protonated solvent species within the connected clusters or channels serves as the major charge carrier in the membrane via hopping mechanism or vehicle mechanism. Water or methanol transport through the membrane is accomplished by moving through the ion-cluster pores and the connecting ion channels, or in more general way, through the hydrophilic network, while in the hydrophobic PTFE region both methanol and water have negligible solubility.

When zeolite particles are incorporated in the membrane, due to the hydrophilic property, they have a tendency to stay in the hydrophilic region of the membrane, which would affect the structure of the Nafion. Nafion is a random copolymer of perfluoroethylene units and ionomeric units. It has been shown that in a Nafion membrane a significant portion (approximately 20%) of the sulfonic acid groups are buried within the clusters of hydrophobic regions of the perfluoroethylene backbone, and are unused for proton transport. One possible reason for the enhanced proton conduction is that the introduction of the acid functionalized zeolite nanocrystals causes an increase in ordering during the casting process or allows more ionic groups located within the vicinity of the hydrophilic particle surface to be exposed, instead of being buried underneath the PTFE backbone, which results in the acid groups of the Nafion polymer being more accessible for proton transport.

The lowered methanol crossover can be explained by the blocking of the hydrophilic channel with the zeolite particles. It should be mentioned that the sulfonic acid functionalized zeolite has a porous structure. Although the pore size is not small enough to physically exclude the transport of methanol or water, it is believed the transport rate of these small molecules through the porous structure is drastically reduced. The reason is that the motion of the water initially existing in the pores is restricted and the water is actually trapped inside the pores which blocks the transport of small molecules. However, the proton conduction is not impeded by the existence of zeolite particles. Under such circumstance, it is believed that hopping mechanism is the predominant working mechanism, where the proton conduction is realized by the proton jumping from hydronium ion to the proton accepting water molecule adjacent to the sulfonic groups without the bodily drift of the hydronium (therefore no net water movement through the pores). The vehicular mechanism that requires the existence of mobile bulk-like water molecules to travel along with protons is unfavored because of the lack of mobile water molecules. The bounded movement of the methanol with proton due to the electro-osmotic drag is also mitigated with the introduction of zeolite.

The above bases can be used for the explanation of the slight improvement of proton conductivity when the membranes are subject to insufficient hydration at high temperature. At such condition, it is known that the membrane is in lack of mobile bulk-like water molecules.

The introduction of sulfonic acid functionalized zeolite may allow the proton transport surrounding the zeolite to proceed more preferentially via the hopping mechanism than the vehicular mechanism as it adsorbs water or place restriction on the motion of water molecules. The overall effect is the mitigated dragging of the water by the proton and therefore the improved proton conductivity.

The performance of the fuel cell using the membrane in accordance with the embodiments of the present invention constructed with a 5 wt % acid zeolite BEA/polymer nanocomposite membrane was enhanced over that of a MEA using a Nafion 117 membrane, as indicated by a 10% higher power output at 60 mA/cm$^2$ and a 32% higher power output at 120 mA/cm$^2$. With a 2.5 wt % acid zeolite BEA/polymer nanocomposite membrane, 37% higher power output at 60 mA/cm$^2$ and a 90% higher power output at 120 mA/cm$^2$ was observed. This operation data was obtained at 70° C. and 26 psi pressurization; the anode of 40% PtRu/C, 1.0 mg/cm$^2$ and a cathode of cathode: 20% Pt/C, 0.4 mg/cm$^2$. Varying the operation temperature of the DMFC, methanol crossover current in A/cm$^2$ was determined using potentiodynamic sweeping to be approximately 40% that of a MEA made with Nafion 117 as the proton conducting membrane.

As will be understood by those skilled in the art, the present invention may be embodied in other specific forms without departing from the essential characteristics thereof. For example, steps may be combined or expanded during the synthesis of the nanocomposite membranes. These other embodiments are intended to be included within the scope of the present invention, which is set forth in the following claims.

What is claimed is:

1. A proton exchange membrane fuel cell, comprising:
   an anode;
   a first catalyst disposed on said anode;
   a polymer-sulfonic acid functionalized zeolite nanocomposite proton exchange membrane disposed adjacent to said first catalyst, said membrane comprises polymer matrice and zeolite nanocrystals, wherein the zeolite nanocrystals are dispersed into the polymer matrice;
   a second catalyst disposed adjacent to said membrane; and
   a cathode disposed adjacent to said second catalyst.

2. The fuel cell of claim 1 wherein said polymer membrane has a proton conductivity of between 2 and 7×10−2 S/cm.

3. The fuel cell of claim 1 wherein said polymer membrane has a methanol permeability of less than between 0.8 to 5.7×10−6 cm2/s.

4. The fuel cell of claim 1 wherein said polymer membrane has a proton conductivity to permeability ratio of more than between 0.8 to 5.8×104 S sec/cm3.

5. The fuel cell of claim 1 wherein said cell functions in the absence of an external reformer to convert fuels to hydrogen.

6. The fuel cell of claim 1 wherein said membrane is formed by a process, comprising:
   forming a zeolite nanocrystal suspension;
   forming a polymer source suspension;
   combining the zeolite nanocrystal suspension with the polymer source suspension to form a polymer/zeolite nanocomposite membrane;
   ultrasonicating the resulting solution;
   pouring the resulting solution into a casting vessel;
   heating the poured solution in the casting vessel until the solution is dry;
   heat treating the dried solution;
   cooling the casting vessel; and
   removing the formed polymer/zeolite nanocomposite membrane.

7. The fuel cell of claim 6 wherein the size of the zeolite nanocrystal particles match the polymer-network dimensions of the host polymer.

8. The fuel cell of claim 7, wherein the zeolite nanocrystal particles are between about 32 nm and 45 nm.

9. The fuel cell of claim 6 wherein the polymer is a film forming fluorinated sulfonic acid containing polymer.

10. The fuel cell of claim 6 wherein the polymer is selected from the group consisting of a TEFLON (polytetrafluoroethylene) type polymer, perfluorinated polymer, and perfluorinated polymer with sulfonic groups.

11. The fuel cell of claim 6 wherein the weight ratio of the zeolite nanocrystals to that of the polymer in the polymer/zeolite nanocomposite membrane is between a weight ratio of 98.75wt % polymer and 1.25wt % zeolite nanocrystal to 80 wt % polymer and 20wt % zeolite nanocrystal.

* * * * *